(12) United States Patent
Kuze et al.

(10) Patent No.: US 8,898,684 B2
(45) Date of Patent: Nov. 25, 2014

(54) OPTICAL DISC DEVICE INCLUDING A CARRIER FOR HOLDING OPTICAL DISCS IN A STACKED STATE

(71) Applicant: Panasonic Corporation, Osaka (JP)

(72) Inventors: Yuuichi Kuze, Osaka (JP); Hirokuni Hagita, Osaka (JP); Daichi Tamaki, Osaka (JP); Akihito Yoshimi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/036,141

(22) Filed: Sep. 25, 2013

(65) Prior Publication Data

US 2014/0089950 A1   Mar. 27, 2014

(30) Foreign Application Priority Data

Sep. 27, 2012   (JP) ................................. 2012-213654

(51) Int. Cl.
| | | |
|---|---|---|
| G11B 17/03 | (2006.01) | |
| G11B 17/04 | (2006.01) | |
| G11B 33/02 | (2006.01) | |
| G11B 17/08 | (2006.01) | |
| G11B 17/22 | (2006.01) | |

(52) U.S. Cl.
CPC ............ *G11B 17/228* (2013.01); *G11B 17/225* (2013.01)

USPC ........................................ 720/614; 360/98.04

(58) Field of Classification Search
CPC ........ G11B 17/22; G11B 17/223; G11B 17/30
USPC .......... 720/614, 615; 369/30.45, 30.51, 30.55, 369/30.57; 360/98.04–98.06
See application file for complete search history.

(56) References Cited

U.S. PATENT DOCUMENTS

| | | | | |
|---|---|---|---|---|
| 8,607,259 | B2 * | 12/2013 | Takano et al. ................ | 720/714 |
| 2008/0313663 | A1 * | 12/2008 | Oshida et al. ................ | 720/615 |
| 2009/0178066 | A1 * | 7/2009 | Liu et al. ...................... | 720/615 |

FOREIGN PATENT DOCUMENTS

JP       2011-204311       10/2011

* cited by examiner

*Primary Examiner* — Joseph Feild
*Assistant Examiner* — Gustavo Polo
(74) *Attorney, Agent, or Firm* — Wenderoth, Lind & Ponack, L.L.P.

(57) ABSTRACT

An optical disc device according to the present invention performs, in parallel, a first control to convey a first tray in the first optical disc drive group from the disc replacing position to the recording and reproducing position, and a second control to convey a second tray in the second optical disc drive group 40R from the recording and reproducing position to the disc replacing position. The second tray is opposed to the first tray.

8 Claims, 21 Drawing Sheets

OPTICAL DISC DEVICE INCLUDING A CARRIER FOR HOLDING OPTICAL DISCS IN A STACKED STATE

BACKGROUND OF THE INVENTION

1. Field of the Invention

The technical field relates to an optical disc device that supplies an optical disc (a disc-like information recording medium such as a CD, a DVD, or a BD) to each of a plurality of optical disc drives.

2. Description of the Related Art

Conventionally, as an optical disc device of this type, a device disclosed in Patent Document 1 (No. 2011-204311 A) is known, for example. The optical disc device disclosed in Patent Document 1 includes a magazine (cartridge) that stores a plurality of trays (small cartridges) that stores one optical disc, and a plurality of optical disc drives. The optical disc device disclosed in Patent Document 1 is structured such that: an arbitrary tray is drawn out from the magazine; the optical disc stored in the drawn out tray is suctioned and held by a suction pad; and the optical disc is mounted on the tray of an arbitrary optical disc drive.

PATENT DOCUMENTS

Patent Document 1: JP 2011-204311 A

In recent years, with the progress of cloud computing, it is required to further increase data capacity in the optical disc device. In order to increase the data capacity, simply thinking, the number of magazines should be increased and the number of optical discs to be stored should be increased.

However, an increase in the number of pieces of magazines inevitably increases the distance between the optical disc drive and a magazine that is mounted at the farthest position from the optical disc drive. This invites an increase in the optical disc conveying time. Further, since the optical disc device disclosed in Patent Document 1 is structured to supply the optical disc one by one from the magazine to the optical disc drives, considerable time is required for conveying the optical discs to the plurality of optical disc drives.

Accordingly, the applicant has been developed an optical disc device including a carrier which holds a plurality of optical discs in a stacked state, which supplies the held plurality of optical discs to a plurality of optical disc drives, respectively, and which collects the supplied plurality of optical discs in a stacked state.

With the optical disc device, since a plurality of optical discs can be collectively conveyed between the magazine and any optical disc drive, the time required for replacing the optical discs supplied to a plurality of optical disc drives by next optical discs (hereinafter referred to as the disc replacing time) can be drastically suppressed.

However, this optical disc device still remains a matter of improvement in suppressing the disc replacing time.

SUMMARY OF THE INVENTION

The present invention provides an optical disc device with which the disc replacing time can be further suppressed.

The optical disc device according to the present disclosure includes optical disc drives each having a tray conveyed between a recording and reproducing position and a disc replacing position through a tray discharge port formed in one surface of a casing. The optical disc drives perform at least either recording or reproduction with respect to an optical disc mounted on the tray positioned at the recording and reproducing position. A carrier holds a plurality of stacked optical discs in a stacked state, which mounts the held plurality of optical discs on each tray of the optical disc drives. The tray is positioned at the disc replacing position, and the tray collects the plurality of optical discs mounted on each tray in the stacked state. A control unit controls operations of the optical disc drives and the carrier. The optical disc drives include: a first optical disc drive group having a plurality of disc drives stacked in a height direction such that tray discharge ports of the first optical disc drive group are oriented in one direction; and a second optical disc drive group having a plurality of disc drives stacked in the height direction such that tray discharge ports of the second optical group are opposed to the tray discharge ports of the first optical disc drive group. The control unit performs, in parallel, a first control to convey a first tray in the first optical disc drive group from the disc replacing position to the recording and reproducing position, and a second control to convey a second tray in the second optical disc drive group from the recording and reproducing position to the disc replacing position, the second tray being opposed to the first tray.

With the optical disc device of the present disclosure, the disc replacing time can be further suppressed.

BRIEF DESCRIPTION OF THE DRAWINGS

These and other aspects and features of the present disclosure will become clear from the following description taken in conjunction with the preferred embodiments thereof with reference to the accompanying drawings, in which.

DETAILED DESCRIPTION OF THE INVENTION

Figure 1:
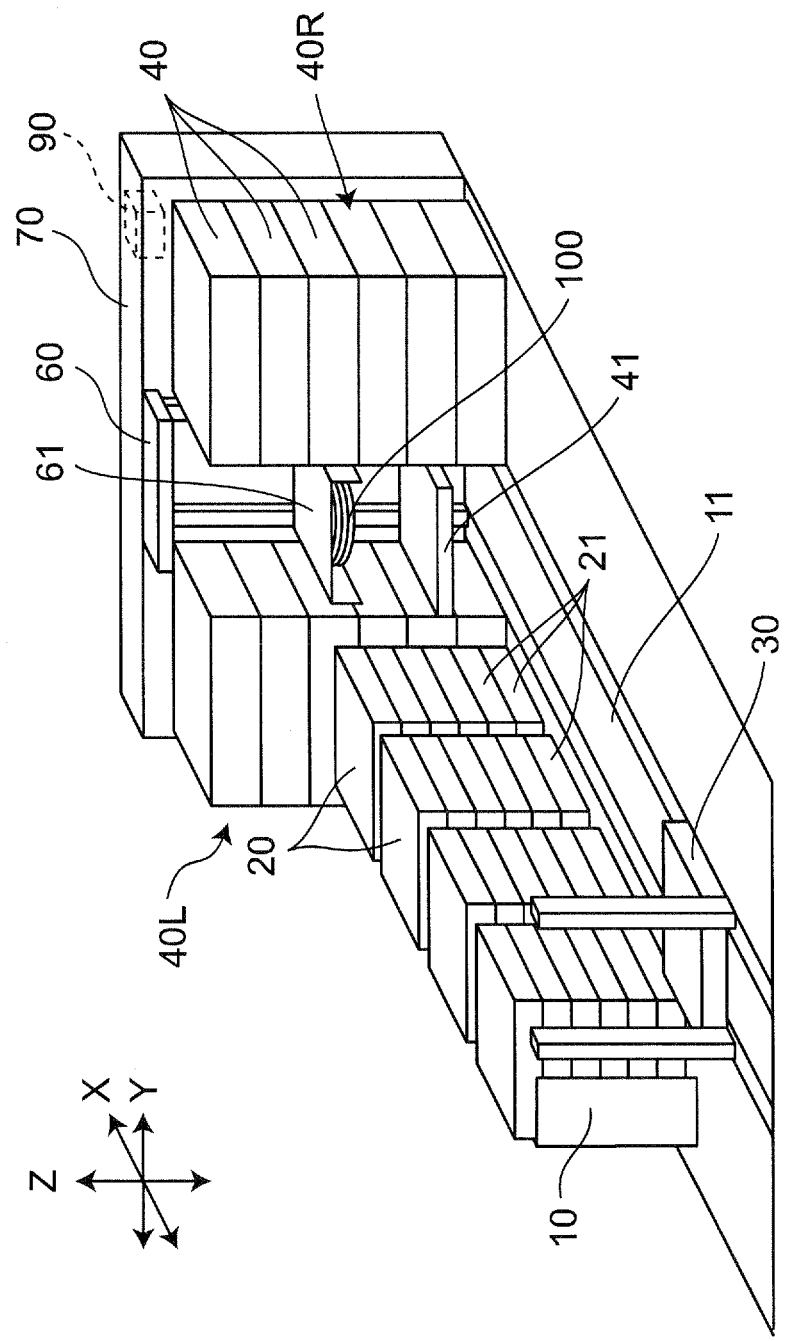
FIG. 1 is a perspective view showing the schematic structure of an optical disc device according to a first embodiment of the present disclosure.

According to a first aspect of the present disclosure, there is provided an optical disc device comprising:

optical disc drives each having a tray conveyed between a recording and reproducing position and a disc replacing position through a tray discharge port formed in one surface of a casing, the optical disc drives performing at least either recording or reproduction with respect to an optical disc mounted on the tray positioned at the recording and reproducing position;

a carrier which holds a plurality of stacked optical discs in a stacked state, which mounts the held plurality of optical discs on each tray of the optical disc drives, the tray being positioned at the disc replacing position, and which collects the plurality of optical discs mounted on each tray in the stacked state;

a control unit which controls operations of the optical disc drives and the carrier, wherein the optical disc drives include:

a first optical disc drive group having a plurality of disc drives stacked in a height direction such that tray discharge ports of the first optical disc drive group are oriented in one direction; and a second optical disc drive group having a plurality of disc drives stacked in the height direction such that tray discharge ports of the second optical group are opposed to the tray discharge ports of the first optical disc drive group, and the control unit performs, in parallel, a first control to convey a first tray in the first optical disc drive group from the disc replacing position to the recording and reproducing position, and a second control to convey a second tray in the second optical disc drive group from the recording and reproducing position to the disc replacing position, the second tray being opposed to the first tray.

According to a second aspect of the present disclosure, there is provided the optical disc device according to the first aspect, wherein the carrier includes a shift base which moves in the height direction, and the carrier performs operations of mounting and collecting the optical discs by moving the shift base in a space between the first optical disc drive group and the second optical disc drive group in the height direction.

According to a third aspect of the present disclosure, there is provided the optical disc device according to the first or second aspect, wherein the control unit further performs, in parallel, a third control to convey the second tray from the disc replacing position to the recording and reproducing position, and a fourth control to convey a third tray of the optical disc drive adjacent to the optical disc drive including the first tray from the recording and reproducing position to the disc replacing position.

According to a fourth aspect of the present disclosure, there is provided the optical disc device according to the first or second aspect, wherein the control unit performs i) control to convey all of the trays in the second optical disc drive group from the recording and reproducing position to the disc replacing position and then, ii) a third control to convey the topmost tray in the second optical disc drive group from the disc replacing position to the recording and reproducing position in parallel with a fourth control to convey the topmost tray in the first optical disc drive group from the recording and reproducing position to the disc replacing position.

According to a fifth aspect of the present disclosure, there is provided the optical disc device according to the fourth aspect, wherein the control unit performs iii) the first control with respect to the topmost tray in the first optical disc drive group as the first tray, and then, iv) the second control with respect to the tray adjacent to the topmost tray in the second optical disc drive group as the second tray.

According to a sixth aspect of the present disclosure, there is provided the optical disc device according to any of the first to fifth aspects, wherein the control unit controls position of each tray of the optical disc drives.

According to a seventh aspect of the present disclosure, there is provided the optical disc device according to any of the first to fifth aspect, further comprising a collision detecting sensor which previously detects contact of the tray in the first optical disc drive group with the tray in the second optical disc drive group, wherein the control unit controls a timing at which each tray of the optical disc drives starts to be conveyed.

According to an eighth aspect of the present disclosure, there is provided an optical disc device comprising:

optical disc drives each having a tray conveyed between a recording and reproducing position and a disc replacing position through a tray discharge port formed in one surface of a casing, the optical disc drives performing at least either recording or reproduction with respect to an optical disc mounted on the tray positioned at the recording and reproducing position;

a carrier which holds a plurality of stacked optical discs in a stacked state, which mounts the held plurality of optical discs on each tray of the optical disc drives, the tray being positioned at the disc replacing position, and which collects the plurality of optical discs mounted each tray in the stacked state;

a control unit which controls operations of the optical disc drives and the carrier, wherein the optical disc drives are stacked in the height direction such that tray discharge ports are oriented in one direction, and the control unit performs, in parallel, a first control to convey a first tray in the optical disc drives from the disc replacing position to the recording and reproducing position, and a second control to convey a second tray adjacent to the first tray, from the recording and reproducing position to the disc replacing position.

According to a ninth aspect of the present disclosure, there is provided the optical disc device according to the eighth aspect, wherein when the carrier performs one of an operation of collecting the optical discs and an operation of mounting the optical discs, the control unit performs the first control in parallel with the second control, and when the carrier performs an other of the operation of collecting the optical discs and the operation of mounting the optical discs, the control unit performs a third control to all of the trays of the optical disc drives from the recording and reproducing position to the disc replacing position and then, a fourth control to sequentially convey the trays of the optical disc drives from the disc replacing position to the recording and reproducing position from a topmost tray to a bottommost tray.

In the following, a detailed description will be given of an embodiment with reference to the drawings as appropriate. It is to be noted that details more than necessary may not be given. For example, a detailed description of well-known matters or a repetitive description of substantially identical structures may be omitted for the purpose of avoiding unnecessary redundancy in the following description, to facilitate understanding of the person skilled in the art.

It is to be noted the inventors provide the accompanying drawings and the following description in order for the person skilled in the art to fully understand the present disclosure. Accordingly, such drawings and description are not intended to limit the subject of the invention defined in the claims.

First Embodiment

FIG. 1 is a perspective view showing the schematic structure of an optical disc device according to a first embodiment of the present disclosure. It is to be noted that, in the first embodiment, the left side in FIG. 1 is referred to as the "device-front side", and the right side in FIG. 1 is referred to as the "device-rear side".

Firstly, with reference to FIG. 1, a description will be given of an overall structure of the optical disc device according to the first embodiment.

The optical disc device according to the first embodiment includes two magazine stockers 10. The two magazine stockers 10 are provided on a bottom chassis 11 so as to oppose to each other in a width direction Y. It is to be noted that, in FIG. 1, one of the magazine stockers 10 (on the right side) is not shown. Further, the top panel and the partition plate of the magazine stocker 10 are not shown in FIG. 1.

Figure 2:
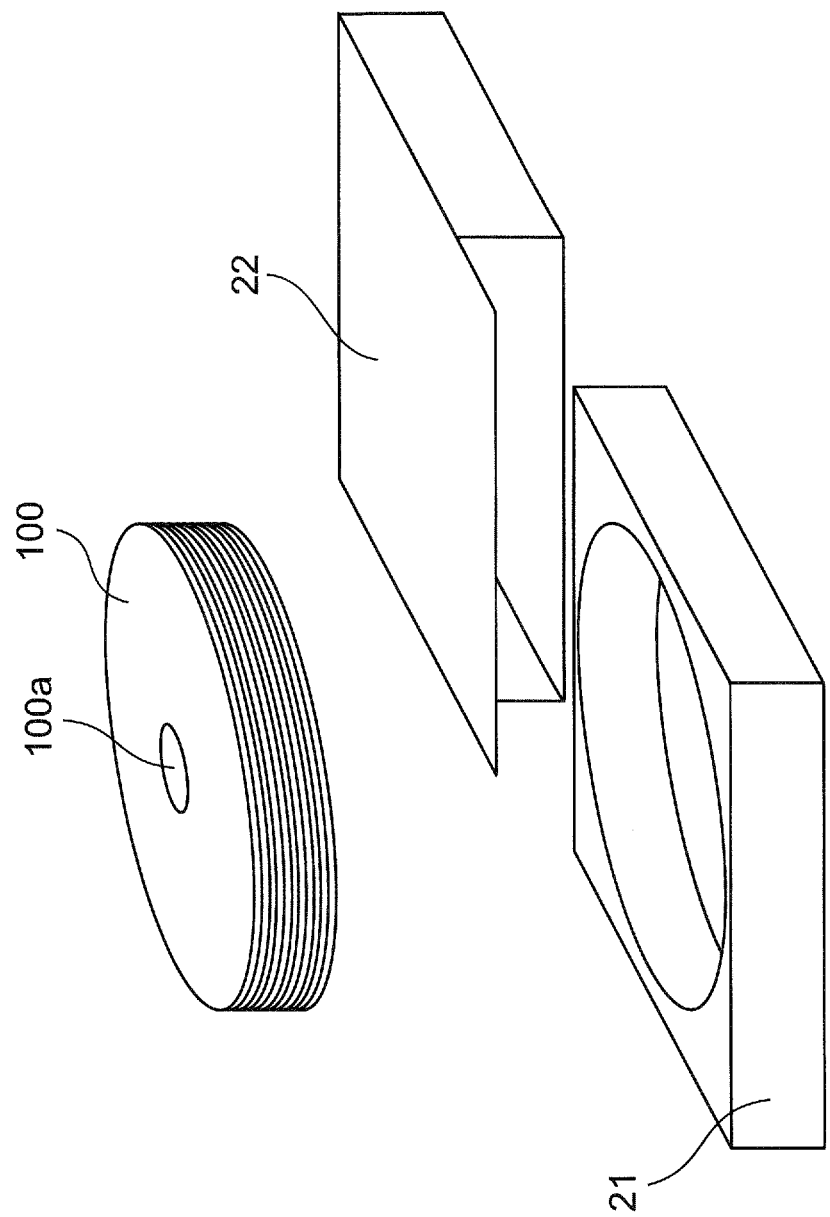
FIG. 2 is a perspective view of a magazine included in the optical disc device shown in FIG. 1.

Each magazine stocker 10 stores a plurality of magazines 20. As shown in FIG. 2, each magazine 20 includes magazine trays 21 storing a plurality of (e.g., 12 pieces of) optical discs. Between the two magazine stockers 10, a picker 30 that draws out the magazine tray 21 from one magazine 20 selected from a plurality of magazines 20 and that holds the magazine tray 21 is provided.

The picker 30 is structured to convey the held magazine tray 21 to a position near a plurality of optical disc drives 4 arranged at the device-rear side.

The optical disc drive 40 records and/or reproduces information in/from an optical disc 100. The optical disc drive 40 is a tray-type optical disc drive that has a tray 41 conveyed to a recording and reproducing position and a disc replacing position through a tray discharge port (not shown) formed in one surface of a casing, and loads the optical disc 100 by using the tray 41. The "recording and reproducing position" refers to the position in the casing of the optical disc drive 40, at which the optical disc drive can perform at least either recording or reproduction of information with respect to the optical disc 100 mounted on the tray 41. The "disc replacing position" refers to the position outside the casing of the optical disc drive 40, at which the optical disc 100 mounted on the tray 41 can be replaced.

The optical disc drives 40 includes a first optical disc drive group 40L stacked in a height direction Z such that tray discharge ports of the first optical disc drive group are oriented in one direction, and a second optical disc drive group 40R stacked in the height direction Z such that tray discharge ports of the second optical disc drive group are opposed to the tray discharge ports of the first optical disc drive group 40L. The first optical disc drive group 40L comprises of, for example, six optical disc drives 40, and is arranged adjacent to the one magazine stocker 10 on the device-rear side. The second optical disc drive group 40R comprises of, for example, six optical disc drives 40, and is arranged adjacent to the other magazine stocker 10 on the device-rear side. A carrier 60 is provided between the first optical disc drive group 40L and the second optical disc drive group 40R.

The carrier 60 holds the plurality of optical discs 100 stored in the magazine tray 21 in a stacked state, mounts the held plurality of optical discs 100 on each tray 41 of the optical disc drives 40 positioned at the disc replacing position, and collects the plurality of optical disc 100 mounted each tray 41 in the stacked state.

On the further device-rear side than the carrier 60 and the optical disc drives 40, an electric circuit and a power supply 70 are provided. The electric circuit and the power supply 70 are provided with a control unit 90 that controls operations (motor and the like) of devices such as the picker 30, the optical disc drives 40, the carrier 60, and the like. The control unit 90 is connected to, for example, a host computer that manages data. The host computer sends commands to the control unit 90 to perform operations such as data reading from or writing on the specified magazine 20, based on instructions from the operator. The control unit 90 controls the operation of the devices such as the picker 30, the optical disc drive 40, the carrier 60, and the like according to the commands.

Next, a description will be given of the structure of the carrier 60 in more detail.

Figure 3:
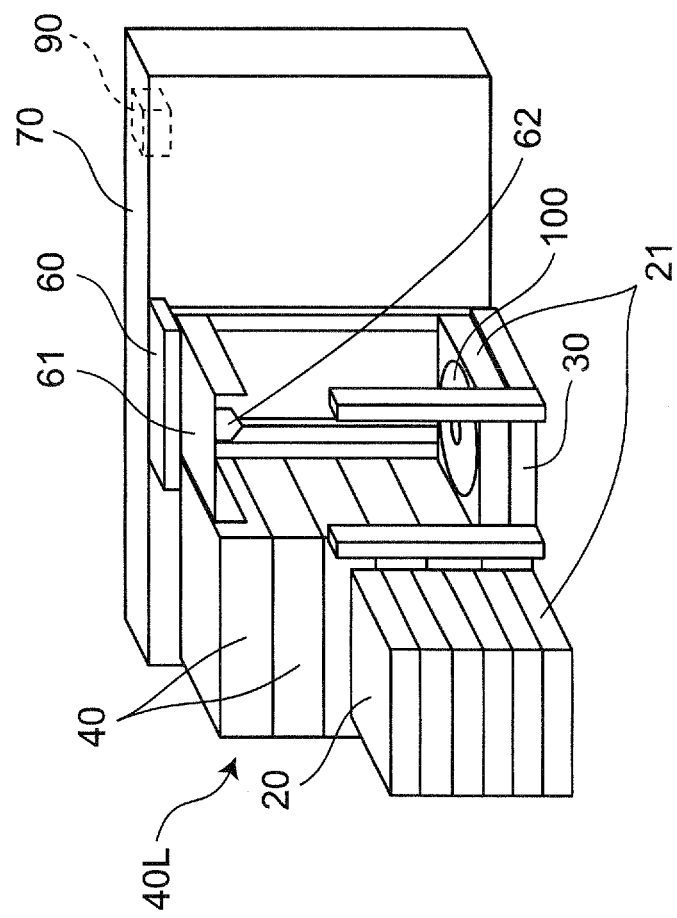
FIG. 3 is a perspective view showing the state where a picker is shifted to a position below the shift base in the optical disc device shown in FIG. 1.

As shown in FIG. 3, the carrier 60 includes a shift base 61 that moves in the height direction Z. The carrier 60 causes the shift base 61 to move in a space between the first optical disc drive group 40L and the second optical disc drive group 40R in the height direction Z, thereby performing operations of mounting and collecting the optical discs 100.

The shift base 61 is provided with a disc chuck unit 62. The disc chuck unit 62 holds the plurality of optical discs 100 in the stacked state, and separates the plurality of held optical discs 100 one by one. For example, the structure as shown in FIG. 18 may be adopted as the disc chuck unit 62 (Refer to Japanese Unexamined Patent Publication No. 2005-25888).

Figure 18:
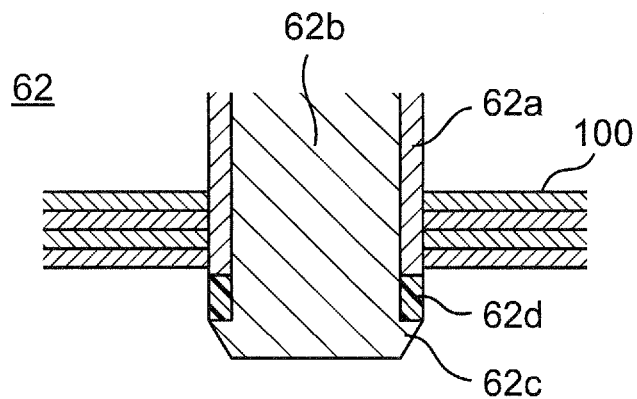
FIG. 18 is a cross sectional view showing an example of configuration of the disc chuck unit included in the carrier shown in FIG. 3.

The disc chuck unit 62 shown in FIG. 18 includes a cylinder 62a having a smaller outer diameter than an inner diameter of a central hole 100a of the optical disc 100, and a rod 62b sliding along the inner surface of the cylinder 62a. A large-diameter head 62c having the substantially same diameter as the outer diameter of the cylinder 62a is provided at a front end of the rod 62b. An elastic body 62d is provided between the large-diameter head 62c and the front end of the cylinder 62a.

The disc chuck unit 62 having such configuration can hold the plurality of optical discs 100 as follows.

First, as shown in FIG. 18, the cylinder 62a and the rod 62b are inserted into the central holes 100a of the plurality of optical discs 100.

Figure 19:
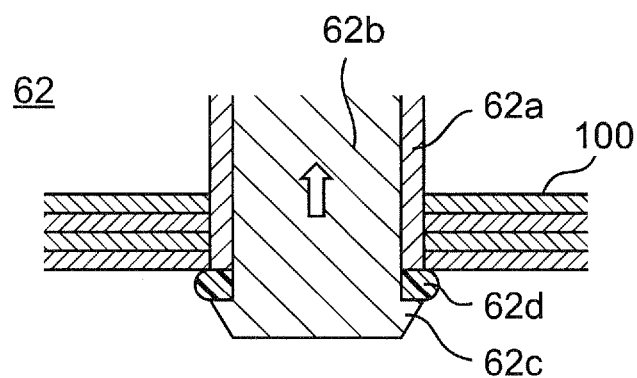
FIG. 19 is a schematic cross sectional view showing the state where the elastic body included in the disc chuck unit shown in FIG. 18 is compressed to deform.

Subsequently, as shown in FIG. 19, the rod 62b is risen to compress the elastic body 62d between the large-diameter head 62c and the front end of the cylinder 62a, thereby deforming the elastic body 62d so as to protrude outward from the outer surface of the cylinder 62a. Thereby, the elastic body 62d can press the inner surface of the bottommost optical disc to hold the plurality of optical discs 100.

The disc chuck unit 62 can mount one optical disc among the plurality of optical discs 100 on the tray 41 as follows.

First, all of the plurality of optical discs 100 held by the disc chuck unit 62 are mounted on the tray 41.

Then, the rod 62b is lowered to cause the elastic body 62d to the undeformed state shown in FIG. 18.

After that, the rod 62b and the cylinder 62a are risen such that the elastic body 62d is adjacent to the optical disc on top of the bottommost optical disc.

Then, the rod 62b is risen to compress the elastic body 62d between the large-diameter head 62c and the front end of the cylinder 62a, thereby deforming the elastic body 62d so as to protrude outward from the outer surface of the cylinder 62a.

Thereby, the elastic body 62d can press the inner surface of the optical disc on top of the bottommost optical disc to separate the bottommost optical disc from other optical discs and mount the separated optical disc on the tray 41, and can hold the other optical discs.

Next, the operation of mounting the plurality of optical discs 100 on the respective trays 41 of the optical disc drives 40 (hereinafter referred to as disc mounting operation) will be described with reference to FIG. 3 to FIG. 8. FIG. 3 to FIG. 8 are perspective views showing the disc mounting operation. The disc mounting operation is made under control of the control unit 90. In FIG. 3 to FIG. 8, for clarification, the second optical disc drive group 40R is not shown.

First, as shown in FIG. 3, the picker 30 conveys the magazine tray 21 below the shift base 61.

Figure 4:
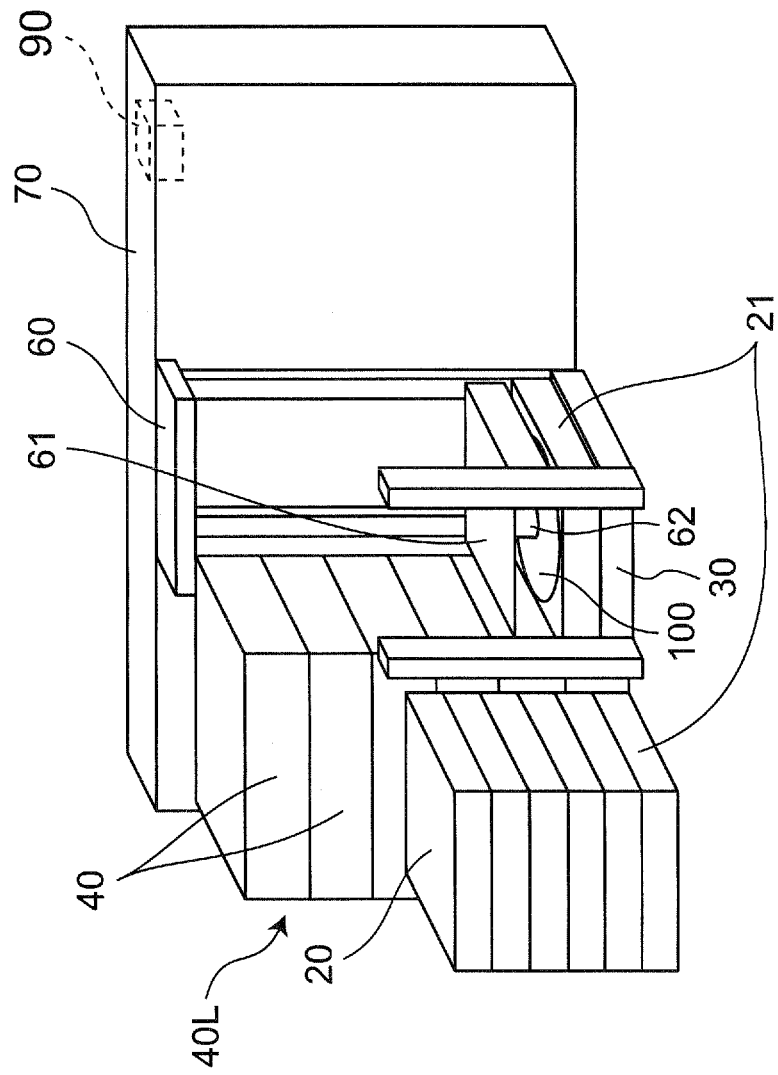
FIG. 4 is a perspective view showing the state where a disc chuck unit included in the carrier shown in FIG. 3 is lowered to a position above and near the magazine tray.

Then, as shown in FIG. 4, the shift base 61 is lowered to the vicinity of the magazine tray 21, resulting in that the front end of the disc chuck unit 62 is inserted into the central holes 100a of the plurality of optical discs 100 on the magazine tray 21.

Then, after the disc chuck unit 62 holds the plurality of optical discs 100, the shift base 61 is risen. Thus, all of the optical discs 100 are detached from the magazine tray 21.

Figure 5:
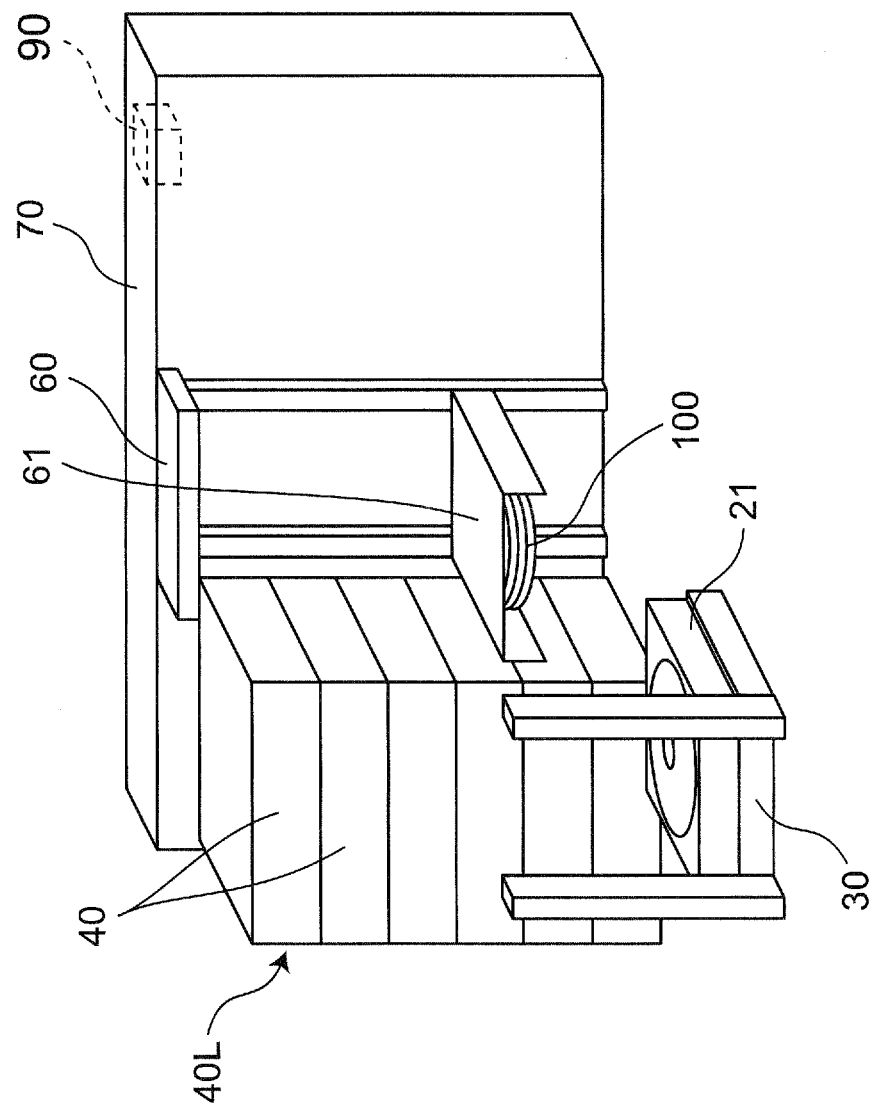
FIG. 5 is a perspective view showing the state, which follows the state shown in FIG. 4, where the picker has shifted to the device-front side, and the magazine tray has receded from the position near the optical disc drive.

Then, as shown in FIG. 5, the picker 30 moves to the device-front side, and the magazine tray 21 is retracted from the vicinity of the optical disc drives 40.

Figure 6:
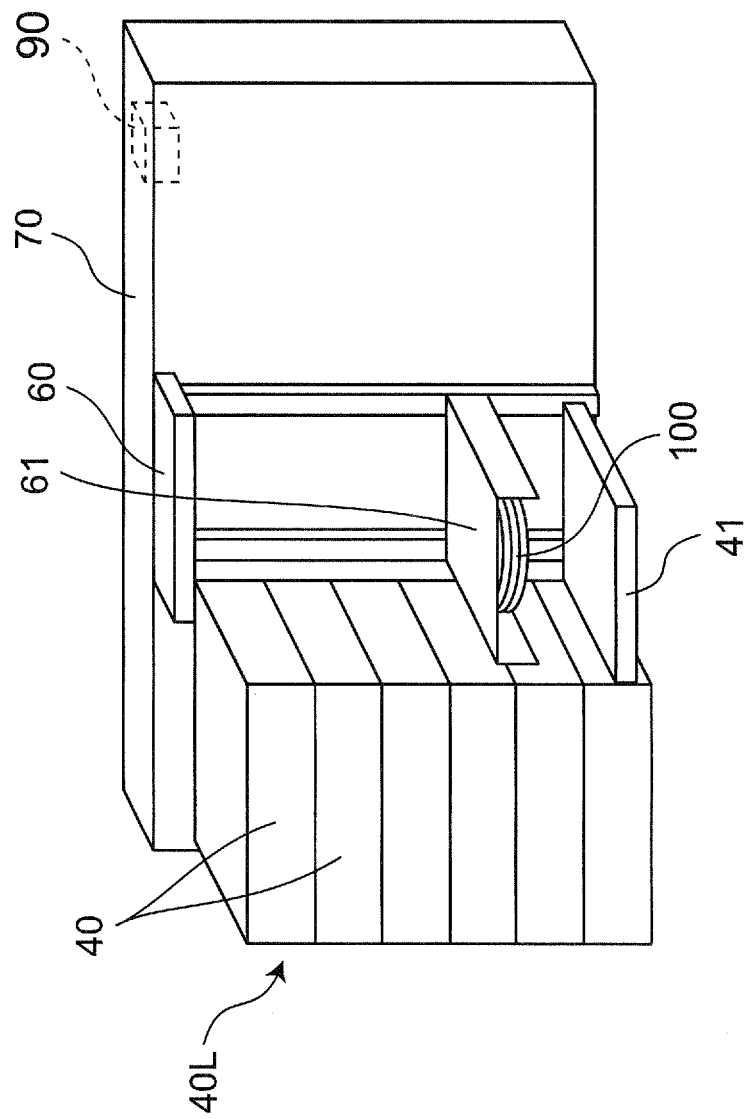
FIG. 6 is a perspective view showing the state, which follows the state shown in FIG. 5, where a tray of the bottommost-stage optical disc drive is ejected.

Then, as shown in FIG. 6, the tray 41 of the bottommost optical disc drive 40 in the first optical disc drive group 40L is conveyed from the recording and reproducing position to the disc replacing position.

Figure 7:
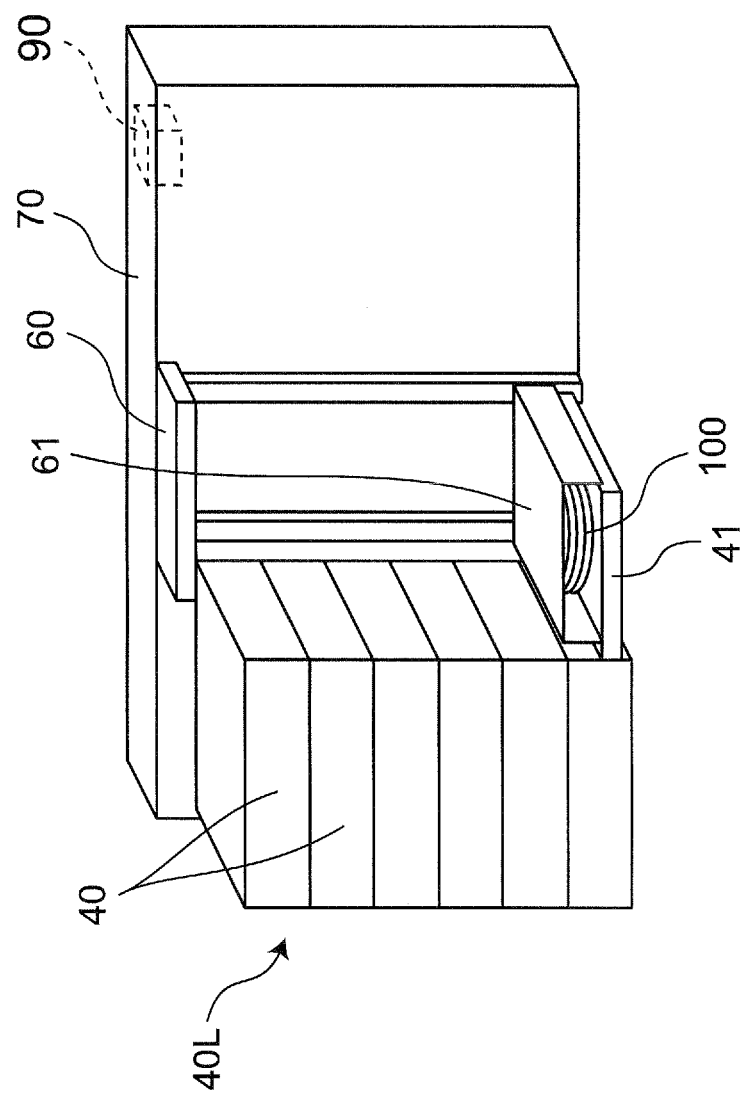
FIG. 7 is a perspective view showing the state, which follows the state shown in FIG. 6, where a shift base is lowered such that the plurality of optical discs held by the disc chuck unit position above the tray.

After that, as shown in FIG. 7, the shift base 61 is lowered such that the plurality of optical discs 100 held by the disc chuck unit 62 are located above (for example, immediately above) the tray 41.

Then, the disc chuck unit 62 separates the bottommost optical disc from the other optical discs, and mounts the separated optical discs on the tray 41.

Then, the shift base 61 is risen so as not to bring the disc chuck unit 62 into contact with the tray 41.

After that, the tray 41 is conveyed from the disc replacing position to the recording and reproducing position. In parallel to the operation of conveying the tray 41 (first tray) from the disc replacing position to the recording and reproducing position, the tray 41 (second tray) of the bottommost optical disc drive 40 in the second optical disc drive group 40R, which is opposed to the first tray 41, is conveyed from the recording and reproducing position to the disc replacing position.

After that, in the same manner as described, the optical disc 100 is mounted on the tray 41 (second tray), and the tray 41 is conveyed from the disc replacing position to the recording and reproducing position. As a result, the disc mounting operation for the bottommost optical disc drive 40 is completed. The disc mounting operation is repeated for the second optical disc drive from the bottom and subsequent upper disc drives 40.

Figure 8:
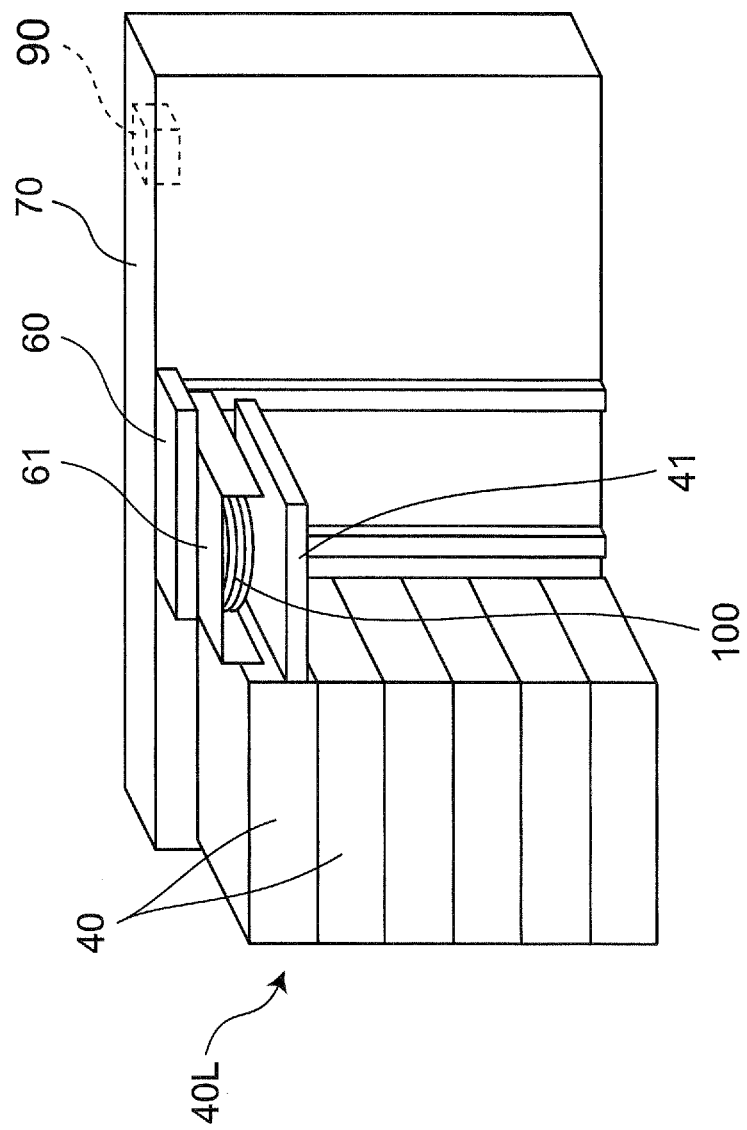
FIG. 8 is a perspective view where the carrier mounts the optical disc on the tray of the topmost-stage optical disc drive.

When the disc mounting operation for the topmost optical disc drive 40 shown in FIG. 8 is completed, all of the optical discs 100 are conveyed to the recording and reproducing position, enabling recording or reproduction in or from the optical discs 100 in each optical disc drive 40.

Next, the operation in which the carrier 60 collects the plurality of optical discs 100 mounted on each tray 41 of the optical disc drives 40 (hereinafter referred to disc collecting operation) will be described. The disc collecting operation is performed under control of the control unit 90. The disc collecting operation is performed in the substantially reverse order to the disc mounting operation.

First, the tray 41 (first tray) of the topmost optical disc drive 40 in the first optical disc drive group 40L is conveyed from the recording and reproducing position to the disc replacing position.

After that, the shift base 61 is lowered, resulting in that the disc chuck unit 62 is inserted into the central hole 100*a* of the optical disc 100 on the tray 41 (first tray), and the disc chuck unit 62 holds the optical disc 100.

Then, the shift base 61 moves upward with the held optical disc 100 so as not to interfere with movement of the tray 41 (first tray). Thereby, the optical disc 100 on the tray 41 (first tray) is collected.

Then, the tray 41 (first tray), on which the optical disc 100 is collected by the disc chuck unit 62, is conveyed from the disc replacing position to the recording and reproducing position. In parallel to the operation of conveying the tray 41 (first tray) from the disc replacing position to the recording and reproducing position, the tray 41 (second tray) of the topmost optical disc drive 40 in the second optical disc drive group 40R, which is opposed to the first tray 41, is conveyed from the recording and reproducing position to the disc replacing position.

After that, as in the same manner as described, the optical disc 100 on the tray 41 (second tray) is collected by the disc chuck unit 62, and the tray 41 is conveyed from the disc replacing position to the recording and reproducing position. Thereby, the optical disc collecting operation for the topmost optical disc drive 40 is completed. The disc collecting operation is repeated for the second optical disc drive from the bottom and subsequent upper optical disc drives 40.

When the disc chuck unit 62 collects all of the optical discs 100, the shift base 61 is risen. Then, the picker 30 moves to the device-rear side, and the magazine tray 21 is set below the disc chuck unit 62.

After that, the shift base 61 is lowered, and all of the optical discs 100 held by the disc chuck unit 62 are stored in the magazine tray 21 as shown in FIG. 4.

The picker 30 returns the magazine tray 21 that stores all of the optical discs 100 into the magazine stocker 10.

Next, with reference to FIG. 9A to FIG. 9E, the disc mounting operation will be described noting the operation of the trays 41 of the optical disc drives 40. FIG. 9A to FIG. 9E are schematic views showing the operation of the trays 41 of the optical disc drives 40 in the disc mounting operation.

The optical disc drives 40 in the first optical disc drive group 40L are referred to as optical disc drives A, C, E, G, I, and K from the bottom. The optical disc drives 40 in the second optical disc drive group 40R are referred to as optical disc drives B, D, F, H, J, and L from the bottom.

Figure 9A:
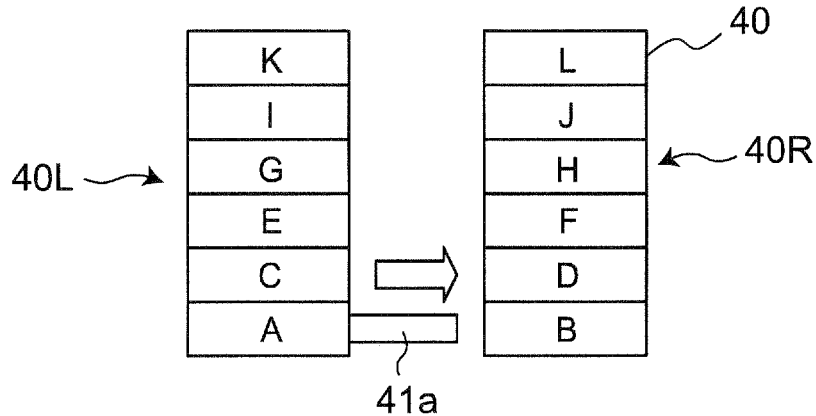
FIG. 9A is schematic view showing the operation of the trays of the optical disc drives in the disc mounting operation of the optical disc device shown in FIG. 1.

First, as shown in FIG. 9A, the tray 41*a* of the bottommost optical disc drive A is conveyed from the recording and reproducing position to the disc replacing position, and the disc chuck unit 62 mounts the optical disc 100 on the tray 41*a*.

Figure 9B:
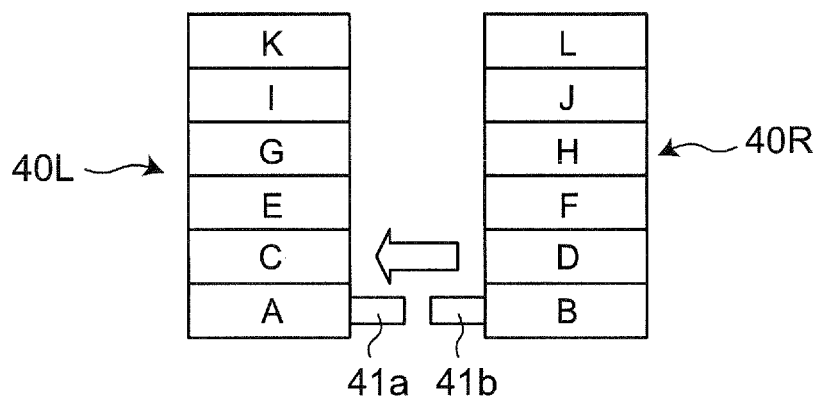
FIG. 9B is schematic view showing the operation of the trays of the optical disc drives in the disc mounting operation of the optical disc device shown in FIG. 1.

Then, as shown in FIG. 9B, the tray 41*a* of the optical disc drive A is conveyed from the disc replacing position to the recording and reproducing position. In parallel with the operation of conveying the tray 41*a*, the tray 41*b* of the optical disc drive B is conveyed from the recording and reproducing position to the disc replacing position. That is, before completing the conveyance of the tray 41*a* from the disc replacing position to the recording and reproducing position, the tray 41*b* starts to be conveyed from the recording and reproducing position to the disc replacing position.

Figure 9C:
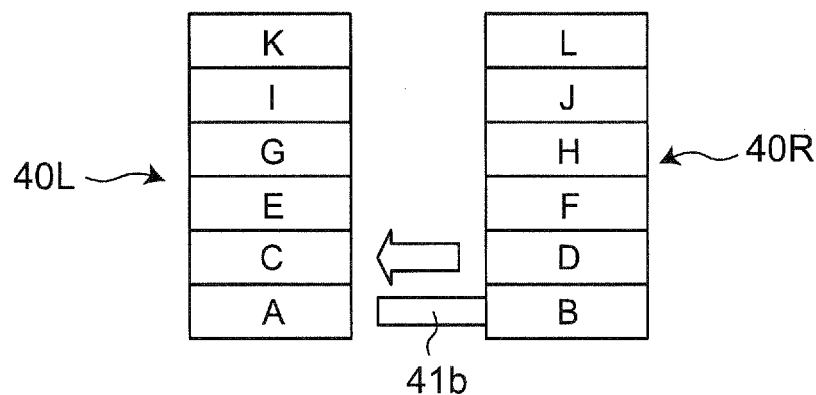
FIG. 9C is schematic view showing the operation of the trays of the optical disc drives in the disc mounting operation of the optical disc device shown in FIG. 1.

As shown in FIG. 9C, when the operation of conveying the tray 41*a* to the recording and reproducing position is completed, and the operation of conveying the tray 41*b* to the disc replacing position is completed, the disc chuck unit 62 mounts the optical disc 100 on the tray 41*b*.

Then, the shift base 61 of the disc chuck unit 62 is moved upward.

Figure 9D:
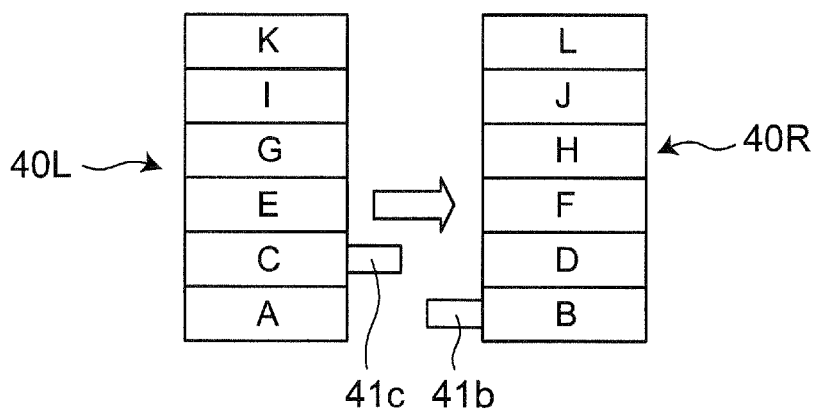
FIG. 9D is schematic view showing the operation of the trays of the optical disc drives in the disc mounting operation of the optical disc device shown in FIG. 1.

After that, as shown in FIG. 9D, the tray 41*b* of the optical disc drive B is conveyed from the disc replacing position to the recording and reproducing position. In parallel with the operation of conveying the tray 41*b*, the tray 41*c* of the optical disc drive C is conveyed from the recording and reproducing position to the disc replacing position.

Figure 9E:
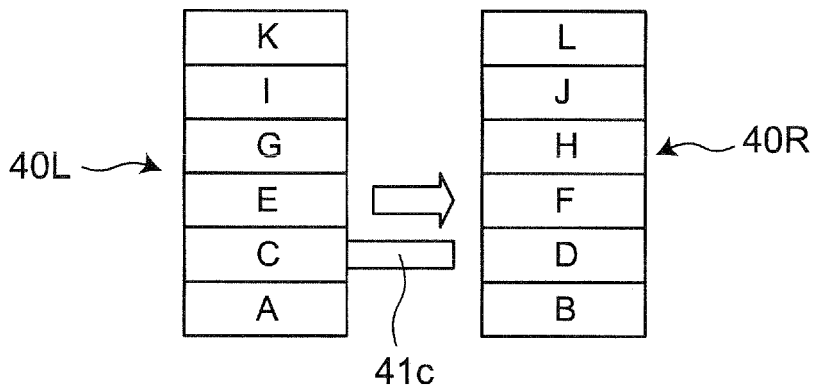
FIG. 9E is schematic view showing the operation of the trays of the optical disc drives in the disc mounting operation of the optical disc device shown in FIG. 1.

As shown in FIG. 9E, when the operation of conveying the tray 41*b* to the recording and reproducing position is completed, and the operation of conveying the tray 41*c* to the disc replacing position is completed, the disc chuck unit 62 mounts the optical disc 100 on the tray 41*c*.

Thereafter, the similar operation is sequentially performed for all of the optical disc drives 40 from the bottom. Thereby, the disc mounting operation is completed.

Next, with reference to FIG. 10A to FIG. 10E, the disc collecting operation will be described noting the operation of the trays 41 of the optical disc drives 40. FIG. 10A to FIG. 10E are schematic views showing the operation of the trays 41 of the optical disc drives 40 in the disc collecting operation.

Figure 10A:
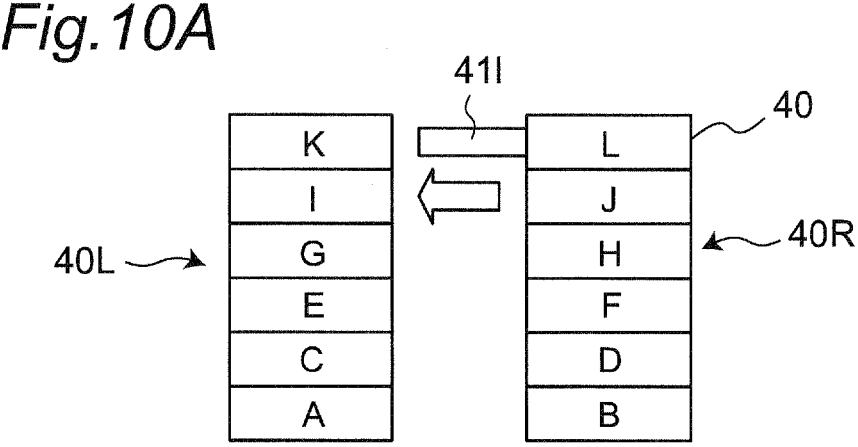
FIG. 10A is schematic view showing the operation of the trays of the optical disc drives in the disc collecting operation of the optical disc device shown in FIG. 1.

First, as shown in FIG. 10A, the tray 41*l* of the topmost optical disc drive L is conveyed from the recording and reproducing position to the disc replacing position, and the disc chuck unit 62 collects the optical disc 100 on the tray 41*l*.

Figure 10B:
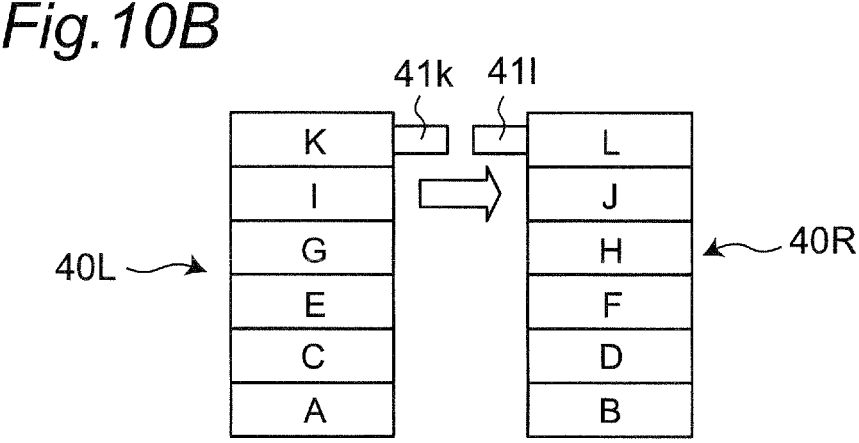
FIG. 10B is schematic view showing the operation of the trays of the optical disc drives in the disc collecting operation of the optical disc device shown in FIG. 1.

Then, as shown in FIG. 10B, the tray 41*l* of the optical disc drive L is conveyed from the disc replacing position to the recording and reproducing position. In parallel with the operation of conveying the tray 41*l*, the tray 41*k* of the optical disc drive K is conveyed from the recording and reproducing position to the disc replacing position. That is, before completing the conveyance of the tray 41*l* from the disc replacing position to the recording and reproducing position, the tray 41*k* starts to be conveyed from the recording and reproducing position to the disc replacing position.

Figure 10C:
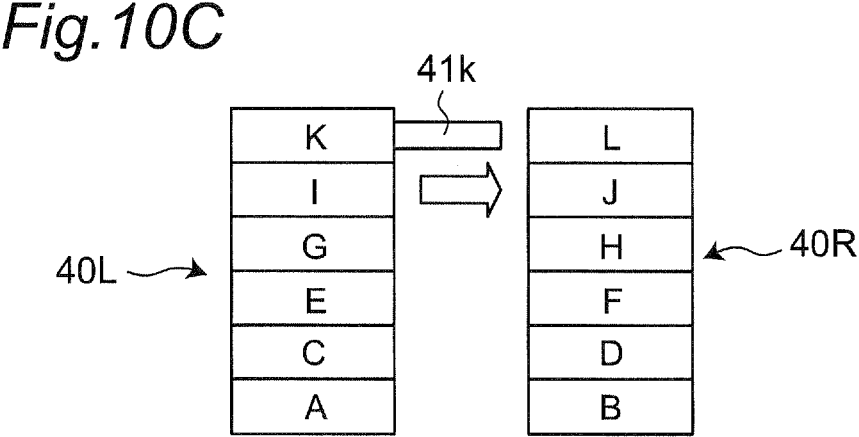
FIG. 10C is schematic view showing the operation of the trays of the optical disc drives in the disc collecting operation of the optical disc device shown in FIG. 1.

As shown in FIG. 10C, when the operation of conveying the tray 41*l* to the recording and reproducing position is completed, and the operation of conveying the tray 41*k* to the disc replacing position is completed, the disc chuck unit 62 collects the optical disc 100 on the tray 41*k*.

Figure 10D:
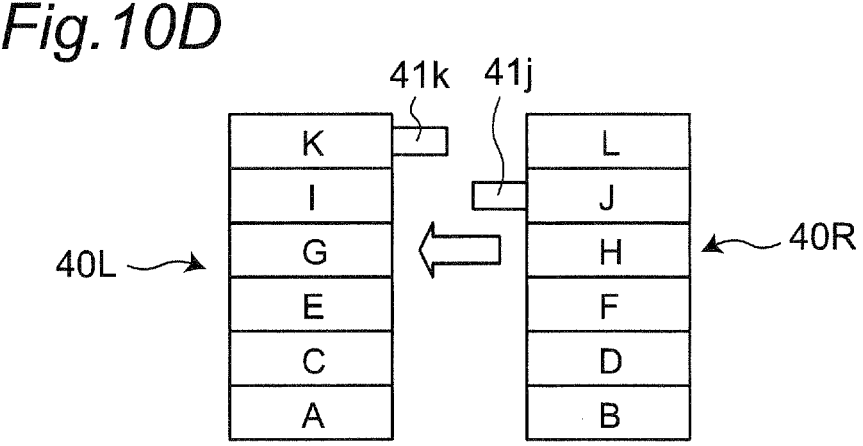
FIG. 10D is schematic view showing the operation of the trays of the optical disc drives in the disc collecting operation of the optical disc device shown in FIG. 1.

After that, as shown in FIG. 10D, the tray 41*k* of the optical disc drive K is conveyed from the disc replacing position to the recording and reproducing position. In parallel with the operation of conveying the tray 41*k*, the tray 41*j* of the optical disc drive J is conveyed from the recording and reproducing position to the disc replacing position.

Figure 10E:
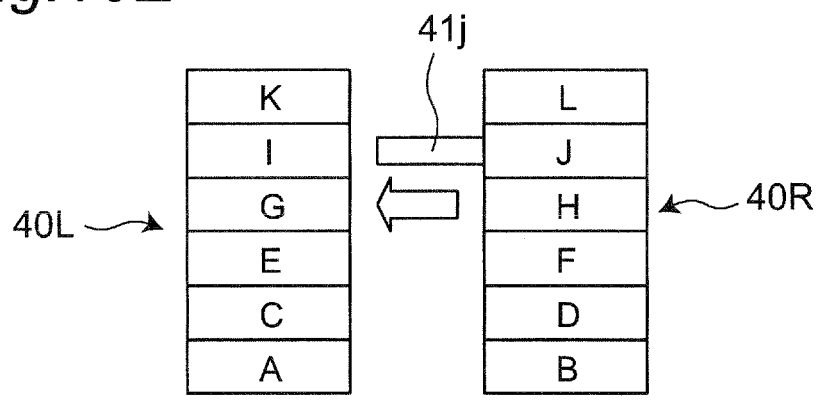
FIG. 10E is schematic view showing the operation of the trays of the optical disc drives in the disc collecting operation of the optical disc device shown in FIG. 1.

As shown in FIG. 10E, when the operation of conveying the tray 41*k* to the recording and reproducing position is completed, and the operation of conveying the tray 41*j* to the disc replacing position is completed, the disc chuck unit 62 collects the optical disc 100 on the tray 41*j*.

Thereafter, the similar operation is sequentially performed for all of the optical disc drives 40 from the top to the bottom. Thereby, the disc collecting operation is completed.

As described above, in the optical disc device in accordance with the first embodiment, the control unit 90 performs control to convey the tray in the first optical disc drive group 40L from the disc replacing position to the recording and reproducing position, and control to convey the tray in the second optical disc drive group 40R, which is opposed to the tray in the first optical disc drive group 40L, from the recording and reproducing position to the disc replacing position, in parallel. Therefore, as compared to the optical disc device in which after completing conveyance of the tray in the first optical disc drive group 40L, the tray in the second optical disc drive group 40R starts to be conveyed, the disc replacing time can be greatly reduced.

The disc collecting operation is not limited to the above-mentioned operation, and may be an operation as shown in FIG. 11A to FIG. 11E. FIG. 11A to FIG. 11E are schematic views showing a modification example of the operation of the trays of the optical disc drives in the disc collecting operation.

Figure 11A:
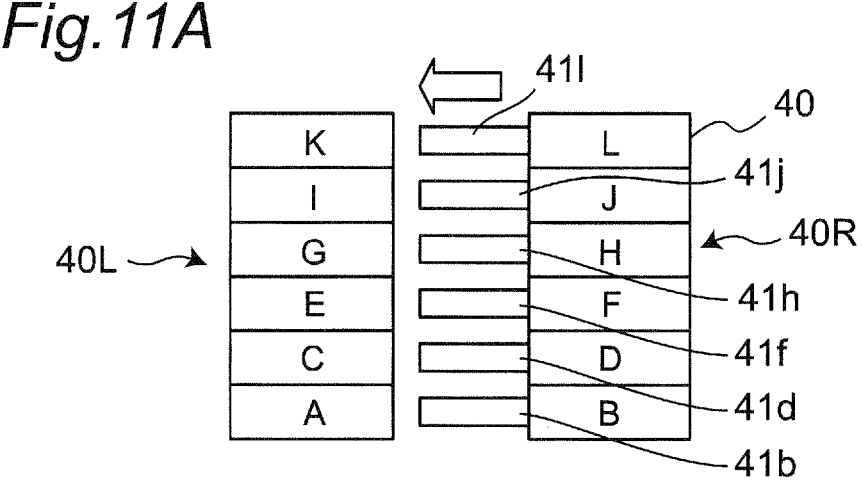
FIG. 11A is schematic view showing a modification example of the operation of the trays of the optical disc drives in the disc collecting operation of the optical disc device shown in FIG. 1.

First, as shown in FIG. 11A, all of the trays 41*b*, 41*d*, 41*f*, 41*h*, 41*j*, and 411 of the second optical disc drive group 40R are (preferably simultaneously) conveyed from the recording and reproducing position to the disc replacing position.

Then, the disc chuck unit 62 collects the optical disc 100 on the tray 41*l* of the topmost optical disc drive L.

Figure 11B:
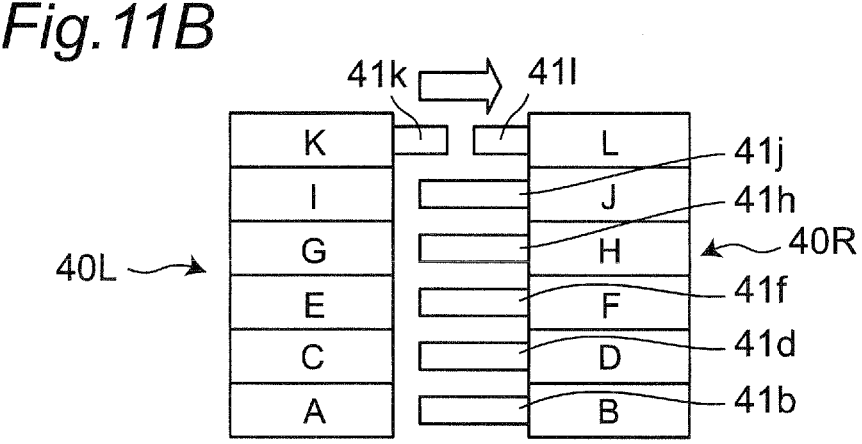
FIG. 11B is schematic view showing a modification example of the operation of the trays of the optical disc drives in the disc collecting operation of the optical disc device shown in FIG. 1.

Then, as shown in FIG. 11B, the tray 41*l* of the optical disc drive L is conveyed from the disc replacing position to the recording and reproducing position. In parallel with the operation of conveying the tray 41*l*, the tray 41*k* of the optical disc drive K is conveyed from the recording and reproducing position to the disc replacing position. That is, before completing the conveyance of the tray 41*l* from the disc replacing position to the recording and reproducing position, the tray 41*k* starts to be conveyed from the recording and reproducing position to the disc replacing position.

Figure 11C:
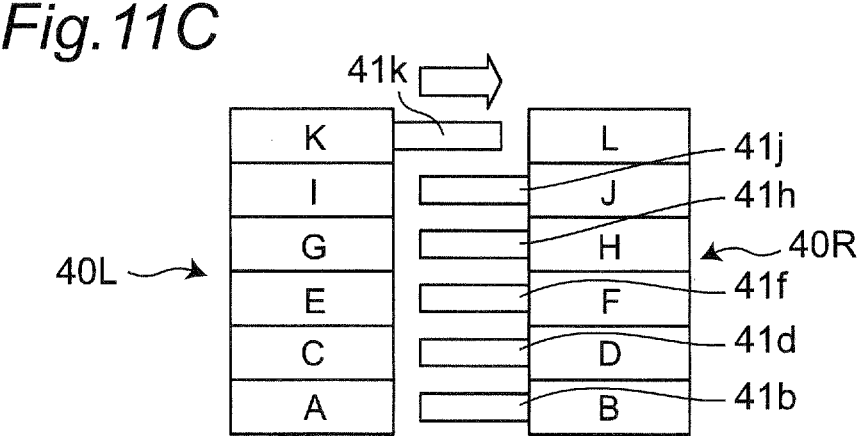
FIG. 11C is schematic view showing a modification example of the operation of the trays of the optical disc drives in the disc collecting operation of the optical disc device shown in FIG. 1.

As shown in FIG. 11C, when the operation of conveying the tray 41*l* to the recording and reproducing position is completed, and the operation of conveying the tray 41*k* to the disc replacing position is completed, the disc chuck unit 62 collects the optical disc 100 on the tray 41*k*.

Figure 11D:
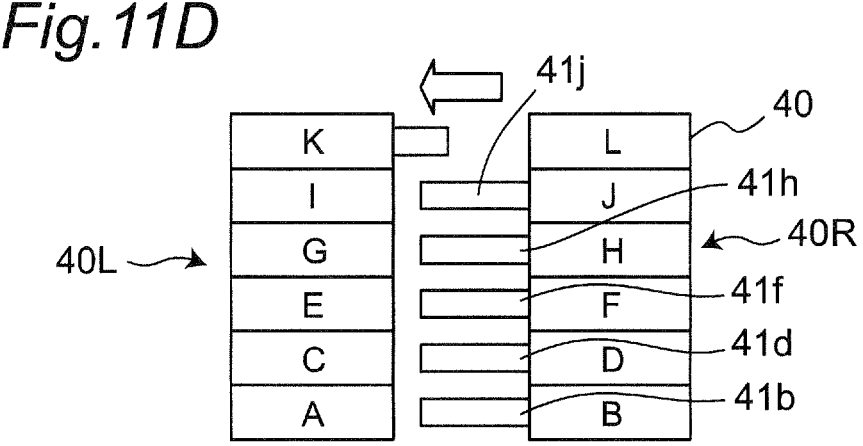
FIG. 11D is schematic view showing a modification example of the operation of the trays of the optical disc drives in the disc collecting operation of the optical disc device shown in FIG. 1.

After that, as shown in FIG. 11D, the tray 41*k* of the optical disc drive K is conveyed from the disc replacing position to the recording and reproducing position.

Figure 11E:
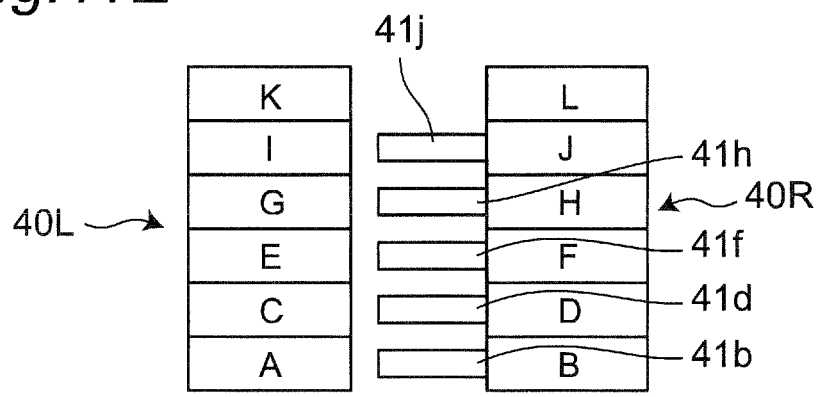
FIG. 11E is schematic view showing a modification example of the operation of the trays of the optical disc drives in the disc collecting operation of the optical disc device shown in FIG. 1.

As shown in FIG. 11E, when the operation of conveying the tray 41*k* to the recording and reproducing position is completed, the disc chuck unit 62 collects the optical disc 100 on the tray 41*j*.

Thereafter, the similar operation is sequentially performed for all of the optical disc drives 40 from the top to the bottom. Thereby, the disc collecting operation is completed.

According to this disc collecting operation, the control unit 90 performs control to convey all of the trays 41*b*, 41*d*, 41*f*, 41*h*, 41*j*, and 411 in the second optical disc drive group 40R from the recording and reproducing position to the disc replacing position, and then, performs control to convey the topmost tray 41*l* in the second optical disc drive group 40R from the disc replacing position to the recording and reproducing position and control to convey the topmost tray 41*k* in the first optical disc drive group 40L from the recording and reproducing position to the disc replacing position, in parallel. This can greatly reduce the disc replacing time as well as make the control of the control unit 90 simpler than the disc collecting operation shown in FIG. 10A to FIG. 10E. However, it should be noted that, the disc collecting operation in FIG. 10A to FIG. 10E ensures a longer time when each tray in the second optical disc drive group 40R is located at the recording and reproducing position than the disc collecting operation in FIG. 11A to FIG. 11E and therefore, recording or reproduction in or from the optical disc 100 on the tray can be advantageously performed during the time.

In the above-mentioned embodiment, each of the first optical disc drive group 40L and the second optical disc drive group 40R includes the six optical disc drives 40 and however, this disclosure is not limited to this. Each of the first optical disc drive group 40L and the second optical disc drive group 40R only needs to include two or more optical disc drives.

In the above-mentioned embodiment, the operation of the trays in FIG. 9A to FIG. 9E is the disc mounting operation, and the operation of the trays in FIG. 10A to FIG. 10E and FIG. 11A to FIG. 11E is the disc collecting operation and however, this disclosure is not limited to this. For example, the operation of the trays in FIG. 9A to FIG. 9E may be the disc collecting operation, and the operation of the trays in FIG. 10A to FIG. 10E and FIG. 11A to FIG. 11E may be the disc mounting operation. Also in this case, the disc chuck unit 62 can stack and hold the plurality of optical discs 100 in the same order.

Figure 12:
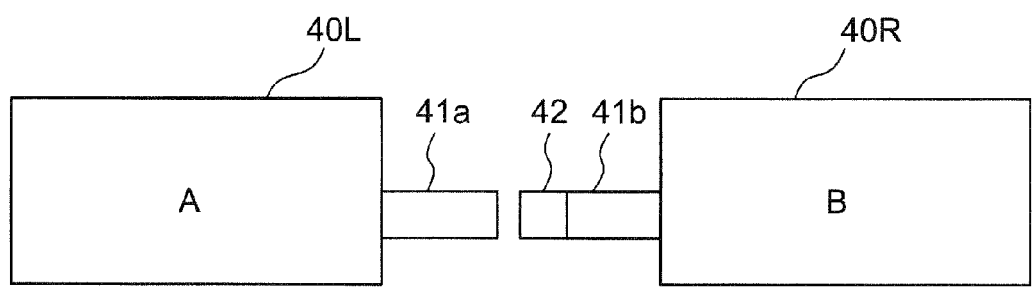
FIG. 12 is schematic view showing the schematic structure of the collision preventing sensor.

The control unit 90 may control the timing at which each tray 41 of the optical disc drives 40 starts to be conveyed. However, in this case, when a motor as a drive source for conveying the tray 41, an output of which varies, is used, the opposed trays 41 may contact each other. For this reason, a collision preventing sensor for previously detecting contact of the tray in the first optical disc drive group 40L with the tray in the second optical disc drive group 40R may be provided. Examples of the collision preventing sensor 42 includes a reflective photosensor (photoreflector, reflective photointerruptor), and a proximity sensor (high-frequency oscillating sensor using electromagnetic induction, magnetic sensor using magnet, and capacitive sensor using change in capacitance). FIG. 12 shows the example in which the non-contact collision preventing sensor 42 is provided at the front end of the tray 41*b* of the optical disc drive B. By providing the collision preventing sensor 42, the speed at which the tray 41*b* is conveyed to the disc replacing position can be decreased, or conveyance of the tray 41*b* to the disc replacing position can be controlled, preventing contact of the tray 41*a* with the tray 41*b*.

Figure 13:
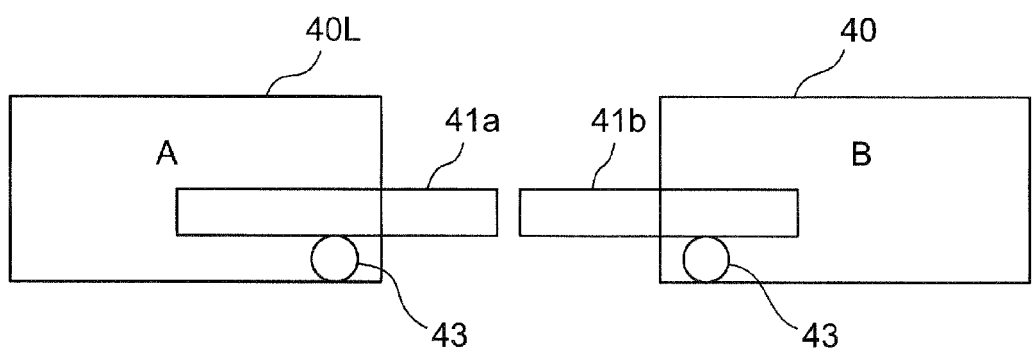
FIG. 13 is schematic view showing an example in which stepping motor is used as a drive source for conveying the trays.

The control unit 90 may control position or speed of each tray 41 of the optical disc drives 40. In this case, since a predetermined distance between the trays in the first optical disc drive group 40L and trays in the second optical disc drive group 40R can be kept, the collision preventing sensor 42 is not required. Examples of a drive source for controlling position or speed of the tray 41 include a stepping motor and an encoder. FIG. 13 shows an example in which stepping motors 43 are used as a drive source for conveying the tray 41*a* of the optical disc drive A and a drive source for conveying the tray 41*b* of the optical disc drive B. In this case, by simultaneously advancing the number of steps of the stepping motors 43, the tray 41*a* and the tray 41*b* can be conveyed at the same speed, preventing these trays from colliding with each other.

Second Embodiment

Figure 14:
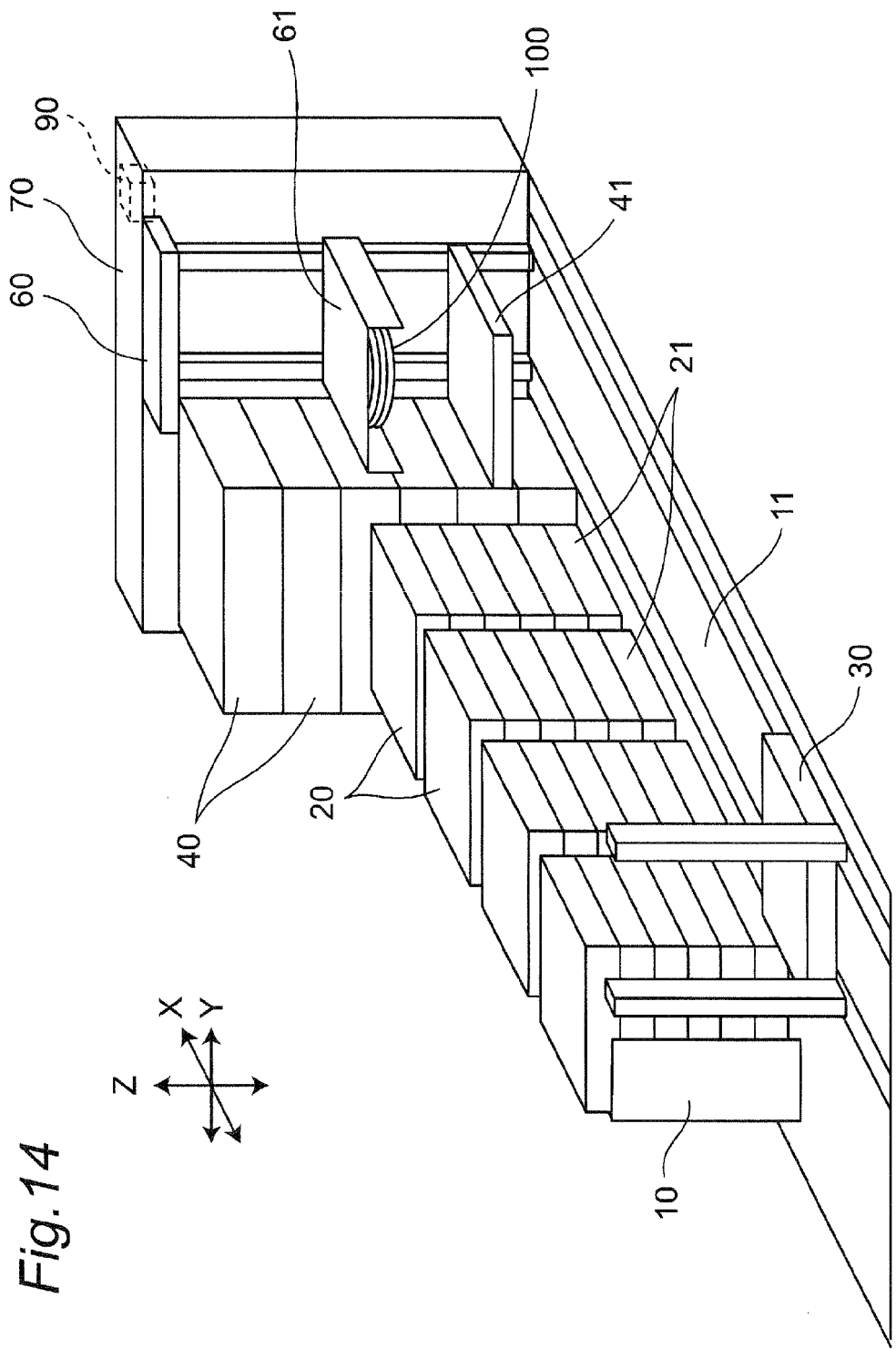
FIG. 14 is a perspective view showing the schematic structure of an optical disc device according to a second embodiment of the present disclosure.

FIG. 14 is a perspective view showing the schematic structure of an optical disc device according to a second embodiment of the present disclosure. The optical disc device according to the second embodiment is different from the optical disc device according to the first embodiment in that the optical disc device according to the second embodiment does not have one of the optical disc drive groups and the magazine stocker 10 adjacent to one of the optical disc drive groups. It is to be noted that, in the second embodiment, the left side in FIG. 14 is referred to as the "device-front side", and the right side in FIG. 14 is referred to as the "device-rear side".

Figure 15A:
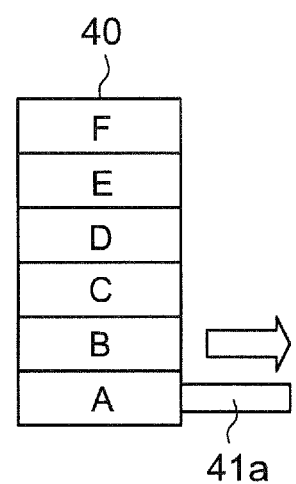
FIG. 15A is schematic view showing the operation of the trays of the optical disc drives in the disc mounting operation of the optical disc device shown in FIG. 14.
Figure 15B:
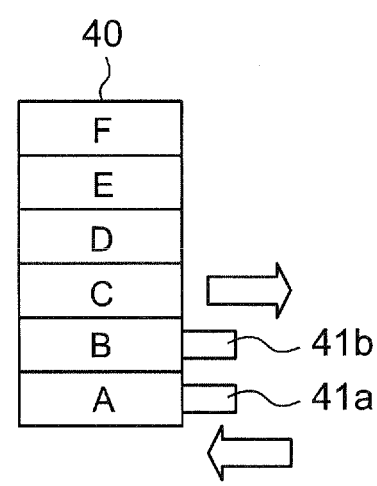
FIG. 15B is schematic view showing the operation of the trays of the optical disc drives in the disc mounting operation of the optical disc device shown in FIG. 14.
Figure 15C:
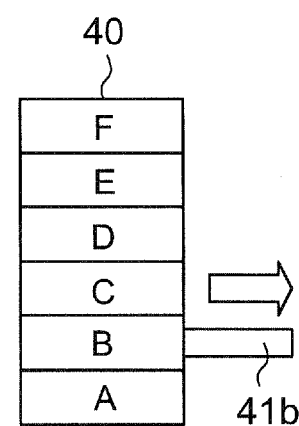
FIG. 15C is schematic view showing the operation of the trays of the optical disc drives in the disc mounting operation of the optical disc device shown in FIG. 13.

Next, with reference to FIG. 15A to FIG. 15C, the disc mounting operation of the optical disc device according to the second embodiment will be described noting the operation of the trays 41 of the optical disc drives 40. FIG. 15A to FIG. 15C are schematic views showing the operation of the trays 41 of the optical disc drives 40 in the disc mounting operation of the optical device according to the second embodiment. The optical disc drives 40 are referred to as optical disc drives A, B, C, D, E, and F from the bottom.

First, as shown in FIG. 15A, the tray 41*a* of the bottommost optical disc drive A is conveyed from the recording and reproducing position to the disc replacing position, and the disc chuck unit 62 mounts the optical disc 100 on the tray 41*a*.

Then, the shift base 61 of the disc chuck unit 62 is moved upward.

Then, as shown in FIG. 15B, the tray 41*a* of the optical disc drive A is conveyed from the disc replacing position to the recording and reproducing position. In parallel with the operation of conveying the tray 41*a* (first tray), the tray 41*b* (second tray) of the optical disc drive B is conveyed from the recording and reproducing position to the disc replacing position. That is, before completing the conveyance of the tray 41*a* from the disc replacing position to the recording and reproducing position, the tray 41*b* starts to be conveyed from the recording and reproducing position to the disc replacing position.

As shown in FIG. 15C, when the operation of conveying the tray 41*a* to the recording and reproducing position is completed, and the operation of conveying the tray 41*b* to the disc replacing position is completed, the disc chuck unit 62 mounts the optical disc 100 on the tray 41*b*.

Thereafter, the similar operation is sequentially performed for all of the optical disc drives 40 from the bottom. Thereby, the disc mounting operation is completed.

Figure 16A:
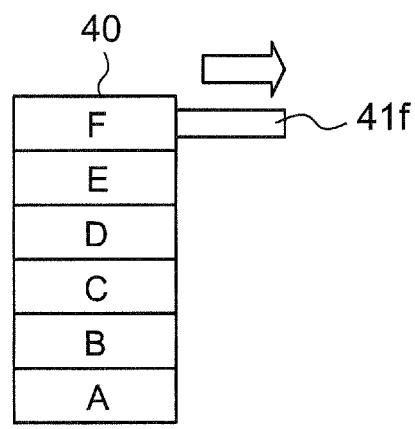
FIG. 16A is schematic view showing the operation of the trays of the optical disc drives in the disc collecting operation of the optical disc device shown in FIG. 14.
Figure 16B:
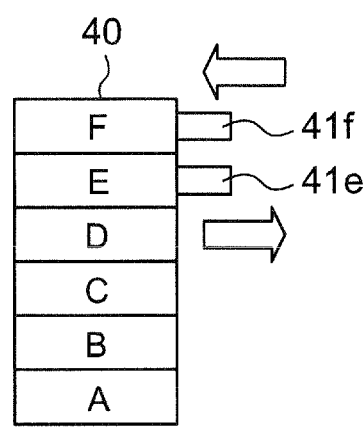
FIG. 16B is schematic view showing the operation of the trays of the optical disc drives in the disc collecting operation of the optical disc device shown in FIG. 14.
Figure 16C:
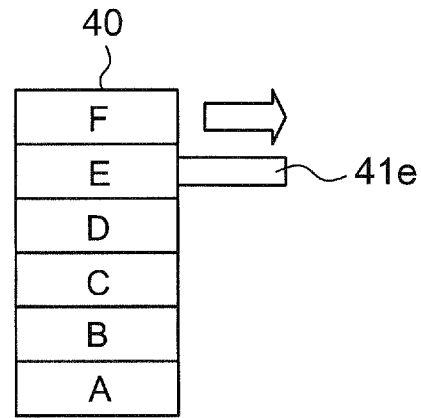
FIG. 16C is schematic view showing the operation of the trays of the optical disc drives in the disc collecting operation of the optical disc device shown in FIG. 14.

Next, with reference to FIG. 16A to FIG. 16C, the disc collecting operation of the optical disc device according to the second embodiment will be described noting the operation of the trays 41 of the optical disc drives 40. FIG. 16A to FIG. 16C are schematic views showing the operation of the trays 41 of the optical disc drives 40 in the disc collecting operation of the optical disc device according to the second embodiment.

First, as shown in FIG. 10A, the tray 41*f* of the topmost optical disc drive F is conveyed from the recording and reproducing position to the disc replacing position, and the disc chuck unit 62 collects the optical disc 100 on the tray 41*f*.

Then, as shown in FIG. 16B, the tray 41*f* (first tray) of the optical disc drive F is conveyed from the disc replacing position to the recording and reproducing position. In parallel with the operation of conveying the tray 41*f*, the tray 41*e* (second tray) of the optical disc drive E is conveyed from the recording and reproducing position to the disc replacing position. That is, before completing the conveyance of the tray 41*f* from the disc replacing position to the recording and reproducing position, the tray 41*e* starts to be conveyed from the recording and reproducing position to the disc replacing position.

As shown in FIG. 16C, when the operation of conveying the tray 41*f* to the recording and reproducing position is completed, and the operation of conveying the tray 41*e* to the disc replacing position is completed, the disc chuck unit 62 collects the optical disc 100 on the tray 41*e*.

Thereafter, the similar operation is sequentially performed for all of the optical disc drives 40 from the top to the bottom. Thereby, the disc collecting operation is completed.

As described above, in the optical disc device in accordance with the second embodiment, the control unit 90 performs control to convey the tray 41*a* or the tray 41*f* in the optical disc drives 40 from the disc replacing position to the recording and reproducing position, and control to convey the tray 41*b* or the tray 41*e* adjacent to the tray 41*a* or the tray 41*f* from the recording and reproducing position to the disc replacing position, in parallel. Therefore, as compared to the optical disc device in which after completing conveyance of a tray in one of optical disc drives, a tray in an optical disc drive adjacent to the tray in one of optical disc drives starts to be conveyed, the disc replacing time can be greatly reduced.

Figure 17A:
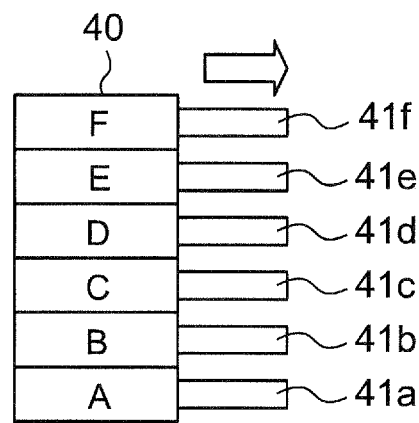
FIG. 17A is schematic view showing a modification example of the operation of the trays of the optical disc drives in the disc collecting operation of the optical disc device shown in FIG. 14.
Figure 17B:
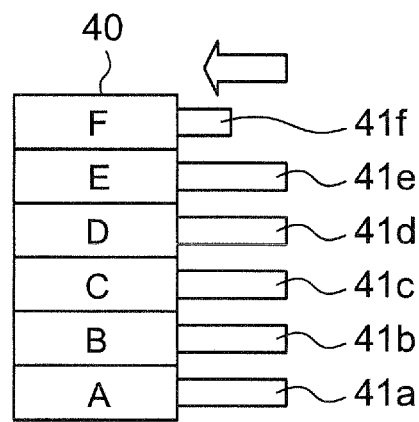
FIG. 17B is schematic view showing a modification example of the operation of the trays of the optical disc drives in the disc collecting operation of the optical disc device shown in FIG. 14.
Figure 17C:
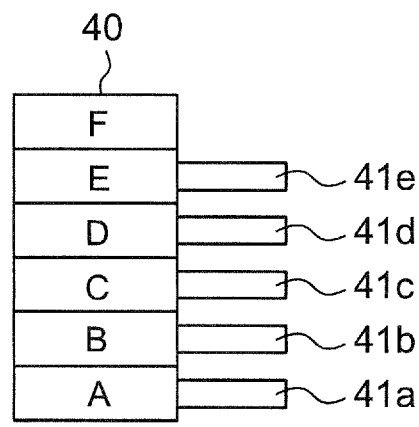
FIG. 17C is schematic view showing a modification example of the operation of the trays of the optical disc drives in the disc collecting operation of the optical disc device shown in FIG. 14.

The disc collecting operation is not limited to the above-mentioned operation, and may be an operation as shown in FIG. 17A to FIG. 17C. FIG. 17A to FIG. 17C are schematic views showing a modification example of the operation of the trays of the optical disc drives in the disc collecting operation.

First, as shown in FIG. 17A, all of the trays 41*a*, 41*b*, 41*c*, 41*d*, 41*e*, and 41*f* of the optical disc drives are (preferably simultaneously) conveyed from the recording and reproducing position to the disc replacing position.

Then, the disc chuck unit 62 collects the optical disc 100 on the tray 41*f* of the topmost optical disc drive F.

Then, as shown in FIG. 17B, the tray 41*f* of the optical disc drive F is conveyed from the disc replacing position to the recording and reproducing position.

As shown in FIG. 17C, when the operation of conveying the tray 41*f* to the recording and reproducing position is completed, the disc chuck unit 62 collects the optical disc 100 of the optical disc drive E on the tray 41*k*.

Thereafter, the similar operation is sequentially performed for all of the optical disc drives 40 from the top to the bottom. Thereby, the disc collecting operation is completed.

According to this disc collecting operation, the control unit 90 performs control to convey all of the trays 41*a*, 41*b*, 41*c*, 41*d*, 41*e*, and 41*f* in the optical disc drives from the recording and reproducing position to the disc replacing position, and then, performs control to sequentially convey the trays of the optical disc drives from the disc replacing position to the recording and reproducing position from the topmost tray to the bottommost. This can greatly reduce the disc replacing time as well as make the control of the control unit 90 simpler than the disc collecting operation shown in FIG. 16A to FIG. 16C. However, it should be noted that, the disc collecting operation in FIG. 16A to FIG. 16C ensures a longer time when each tray in the optical disc drives is located at the recording and reproducing position than the disc collecting operation in FIG. 16A to FIG. 16C and therefore, recording or reproduction in or from the optical disc on the tray can be advantageously performed during the time.

In the above-mentioned embodiment, the operation of the trays in FIG. 15A to FIG. 15C is the disc mounting operation, and the operation of the trays in FIG. 16A to FIG. 16C and FIG. 17A to FIG. 17C is the disc collecting operation and however, this disclosure is not limited to this. For example, the operation of the trays in FIG. 15A to FIG. 15C may be the disc collecting operation, and the operation of the trays in FIG. 16A to FIG. 16C and FIG. 17A to FIG. 17C may be the disc mounting operation. Also in this case, the disc chuck unit 62 can stack and hold the plurality of optical discs 100 in the same order.

Figure 20:
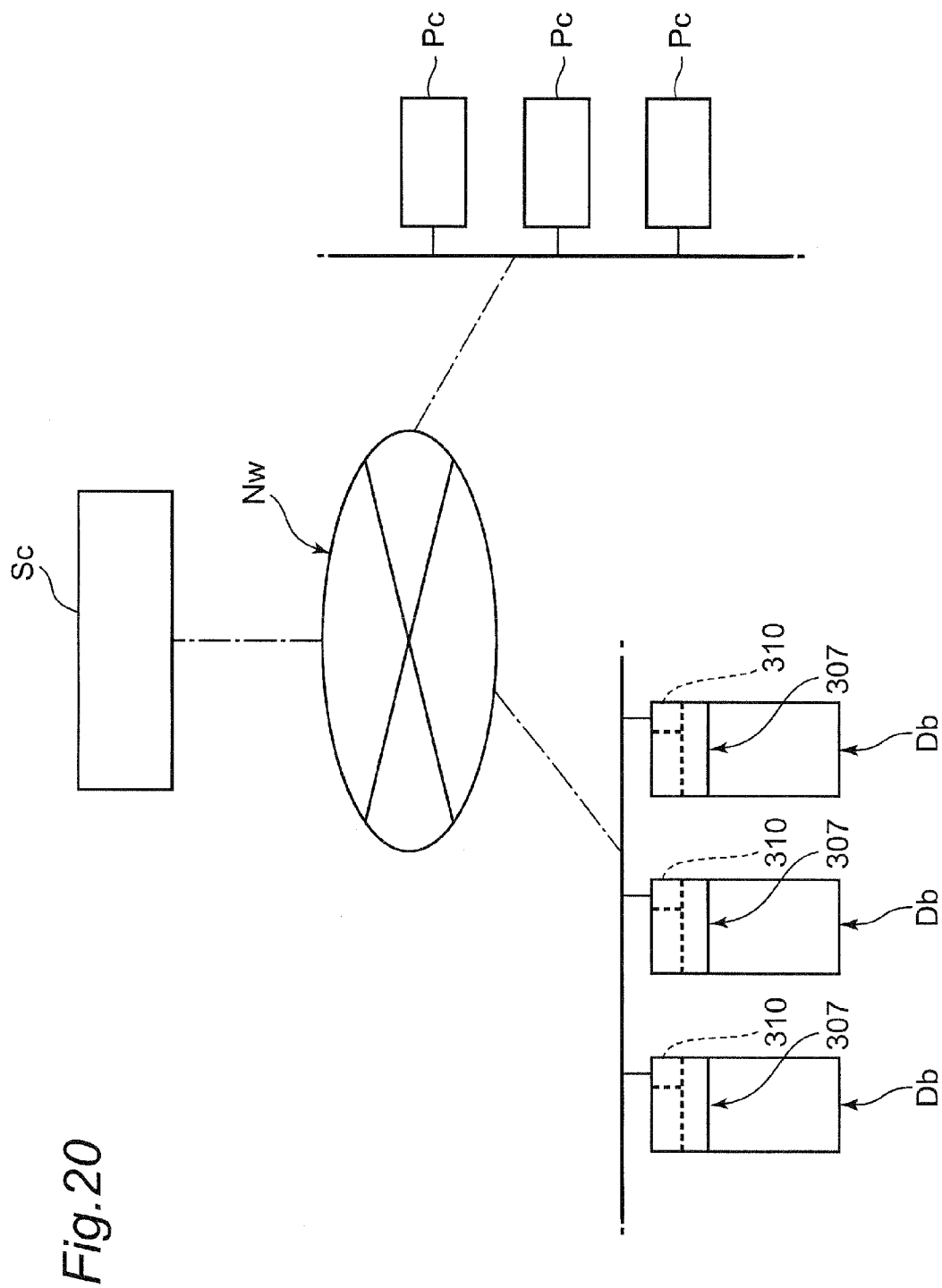
FIG. 20 is a configuration diagram showing an exemplary system configuration when control is exerted over the optical disc device using cloud computing system.

Still further, in the foregoing, though the control unit 90 provided to the electric circuit and the power supply 7 controls the operations of devices such as the picker 30, the optical disc drive 40, the carrier 60 and the like in accordance with instructions from the host computer, such control can also be exerted through use of a so-called cloud computing system. FIG. 20 is a configuration diagram schematically showing an exemplary system configuration when the optical disc device is controlled through use of a cloud computing system.

As shown in FIG. 20, the cloud computing system includes a server Sc that can be accessed through a network Nw (a so-called cloud server). In this case, an optical disc device Db includes a network communication unit 310 in a control unit 307 provided to the electric circuit and the power supply 7, for example. This network communication unit 310 enables the optical disc device Db to be communicatively connected to the cloud server Sc via the network Nw. Such a network communication unit 310 can be provided in the control unit 307 of the optical disc device Db, or it can be provided separately from the control unit 307.

A user terminal machine Pc for operating the optical disc device Db is also communicatively connected to the cloud server Sc via the network Nw. As such a user terminal machine Pc, for example, a so-called personal computer whose substantial unit is a microcomputer and which has a communication function can be used.

The cloud server Sc holds, for example, programs for exerting control or executing operations through use of the user terminal machine Pc, and furthermore at least part of data required for such control or operations. Then, in accordance with any request from the user, the required programs, data and others can be downloaded in each time to be used.

Further, as shown in FIG. 20, such a plurality of user terminal machines Pc may be connected to the network Nw. Still further, it is also possible to connect a plurality of optical disc devices Db to the network Nw and to control each of them.

It is to be noted that the optical disc device Db described above is structured similarly to the optical disc device according to the foregoing embodiment to perform similar operations, except that the optical disc device Db includes the network communication unit 310 and is controlled through use of the cloud server Sc.

As compared to the conventional case where programs, data and others are held by the optical disc device, the user terminal machine or any storage device provided thereto, use of such a cloud computing system makes it possible to simplify such equipment or devices. It is particularly effective when the programs, data and others to be used become inevitably great in volume.

It is to be noted that the cloud server Sc may be used for data backup of the optical disc device Db, in place of or in addition to a use for control or operations of the optical disc device Db.

In the foregoing, the embodiment has been described in order to illustrate the technique of the present disclosure. The accompanying drawings and the detailed description are provided therefor. Accordingly, the constituents shown in the accompanying drawings and the detailed description may contain not only the constituents essential for solving the problem, but also the constituents not being essential but presented for the purpose of illustrating the technique. Therefore, those non-essential constituents in the accompanying drawings or the detailed description should not be immediately determined as being essential on the basis of those non-essential constituents being shown in the accompanying drawings or the detailed description.

Further, since the foregoing embodiment is an illustration of the technique of the present disclosure, various changes, replacements, additions, or eliminations can be made within the scope of claims and equivalents thereof.

With the optical disc device of the present disclosure, the disc replacing time can further be suppressed. Accordingly, it is particularly useful for an optical disc device including many magazines.

The disclosures of Japanese Patent Applications No. 2012-213654 filed on Sep. 27, 2012 including specification, drawing and claims are incorporated herein by reference in its entirety.

What is claimed is:

1. An optical disc device comprising:
   optical disc drives each having a tray conveyed between a recording and reproducing position and a disc replacing position through a tray discharge port formed in one surface of a casing, the optical disc drives performing at least either recording or reproduction with respect to an optical disc mounted on the tray positioned at the recording and reproducing position;
   a carrier which holds a plurality of stacked optical discs in a stacked state, the carrier being configured to mount the held plurality of optical discs on each tray of the optical disc drives, the tray being positioned at the disc replacing position, and the carrier being configured to collect the plurality of optical discs mounted on each tray in the stacked state;
   a control unit which controls operations of the optical disc drives and the carrier,
   wherein the optical disc drives include:
       a first optical disc drive group having a plurality of disc drives stacked in a height direction such that tray discharge ports of the first optical disc drive group are oriented in one direction; and
       a second optical disc drive group having a plurality of disc drives stacked in the height direction such that tray discharge ports of the second optical group are opposed to the tray discharge ports of the first optical disc drive group, and
   wherein the control unit is configured to perform, in parallel:
       a first control operation to convey a first tray in the first optical disc drive group from the disc replacing position to the recording and reproducing position, and
       a second control operation to convey a second tray in the second optical disc drive group from the recording and reproducing position to the disc replacing position, the second tray being opposed to the first tray.

2. The optical disc device according to claim 1, wherein the carrier includes a shift base which moves in the height direction, and
   the carrier is configured to perform operations of mounting and collecting the optical discs by moving the shift base in a space between the first optical disc drive group and the second optical disc drive group in the height direction.

3. The optical disc device according to claim 1, wherein the control unit is further configured to perform, in parallel:
a third control operation to convey the second tray from the disc replacing position to the recording and reproducing position, and
a fourth control operation to convey a third tray of the optical disc drive adjacent to the optical disc drive including the first tray from the recording and reproducing position to the disc replacing position.

4. The optical disc device according to claim 1, wherein the control unit is further configured to perform:
i) control to convey all of the trays in the second optical disc drive group from the recording and reproducing position to the disc replacing position, and then
ii) a third control operation to convey the topmost tray in the second optical disc drive group from the disc replacing position to the recording and reproducing position in parallel with a fourth control operation to convey the topmost tray in the first optical disc drive group from the recording and reproducing position to the disc replacing position.

5. The optical disc device according to claim 4, wherein the control unit is further configured to perform:
iii) the first control operation with respect to the topmost tray in the first optical disc drive group as the first tray, and then
iv) the second control operation with respect to the tray adjacent to the topmost tray in the second optical disc drive group as the second tray.

6. The optical disc device according to claim 1, wherein the control unit is further configured to control position of each tray of the optical disc drives.

7. The optical disc device according to claim 1, further comprising a collision detecting sensor which previously detects contact of the tray in the first optical disc drive group with the tray in the second optical disc drive group, wherein the control unit being configured to control a timing at which each tray of the optical disc drives starts to be conveyed.

8. An optical disc device comprising:
optical disc drives each having a tray conveyed between a recording and reproducing position and a disc replacing position through a tray discharge port formed in one surface of a casing, the optical disc drives performing at least either recording or reproduction with respect to an optical disc mounted on the tray positioned at the recording and reproducing position;
a carrier which holds a plurality of stacked optical discs in a stacked state, the carrier being configured to mount the held plurality of optical discs on each tray of the optical disc drives, the tray being positioned at the disc replacing position, and the carrier being configured to collect the plurality of optical discs mounted on each tray in the stacked state;
a control unit which controls operations of the optical disc drives and the carrier,
wherein the optical disc drives are stacked in the height direction such that tray discharge ports are oriented in one direction,
wherein the control unit performs, in parallel,
a first control operation to convey a first tray in the optical disc drives from the disc replacing position to the recording and reproducing position, and
a second control operation to convey a second tray adjacent to the first tray; from the recording and reproducing position to the disc replacing position;
wherein when the carrier performs one of an operation of collecting the optical discs and an operation of mounting the optical discs, the control unit performs the first control in parallel with the second control, and
wherein when the carrier performs an other of the operation of collecting the optical discs and the operation of mounting the optical discs, the control unit performs:
a third control operation to all of the trays of the optical disc drives from the recording and reproducing position to the disc replacing position, and then
a fourth control operation to sequentially convey the trays of the optical disc drives from the disc replacing position to the recording and reproducing position from a topmost tray to a bottommost tray.

* * * * *